March 14, 1967     W. L. DUDLEY     3,309,601

TUNNEL-DIODE LOW VOLTAGE STATIC INVERTER

Filed Nov. 7, 1963

INVENTOR,
WILLIAM L. DUDLEY.

BY Harry M. Saragovitz,
E. J. Kelly, H. Berl &
J. C. Keppler
               ATTORNEYS

United States Patent Office

3,309,601
Patented Mar. 14, 1967

3,309,601
TUNNEL-DIODE LOW VOLTAGE STATIC INVERTER
William L. Dudley, Shrewsbury, N.J., assignor to the United States of America as represented by the Secretary of the Army
Filed Nov. 7, 1963, Ser. No. 322,257
5 Claims. (Cl. 321—45)

The invention described herein may be manufactured and used by or for the Government for governmental purposes without the payment of any royalty thereon.

This invention relates to static inverters and particularly to static inverters driven by tunnel-diodes.

The main problem relative to static inverters is that of switching the active elements to cause the direct current to switch back and forth through the primary winding of the output transformer. The problem is more difficult in the case of tunnel-diode static inverters than it is in the case of thyratrons or silicon controlled rectifiers, since there is no switching electrode in tunnel-diodes, and the voltages are very low, and very critical. In addition, the limitations of weight and space are becoming more and more exacting.

It is therefore an object of this invention to provide an improved, tunnel-diode, static inverter having a minimum of size and weight.

It is a further object of this invention to provide an improved, tunnel-diode, static inverter wherein only one of the tunnel-diodes at a time is switched by an external control voltage and the other tunnel-diode is switched by the action of the first tunnel-diode.

It is a further object of this invention to provide an improved, tunnel-diode, static inverter wherein one of the tunnel-diodes cannot start conducting heavily until the other tunnel-diode has stopped conducting heavily.

These and other objects of this invention will become apparent from the following specification and the drawings of which:

Figure 1:
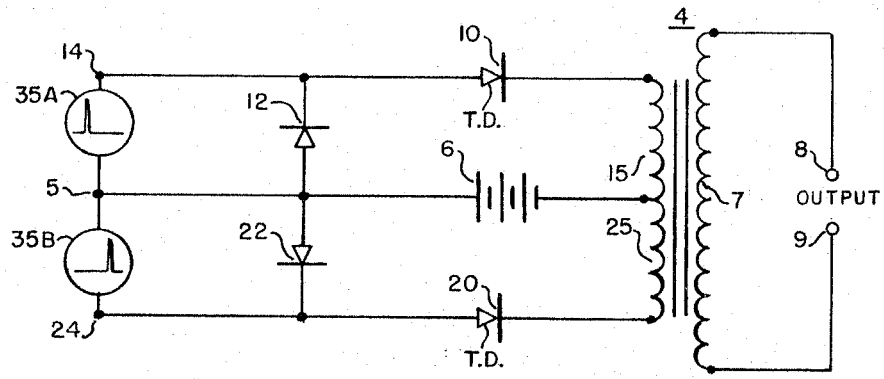
FIG. 1 shows the circuit diagram of a typical embodiment of this invention.

Referring now more particularly to FIG. 1, the transformer 4 has a center-tapped primary, with push-pull connected windings 15 and 25, and a single secondary winding 7 which connects to the output terminals 8 and 9.

The tunnel-diode 10 is connected in series with the blocking diode 12 and the half 15 of the primary winding, across the direct current power supply 6. The tunnel-diode 20 is connected in series with the blocking diode 22 and the other half 25 of the primary winding, across the same direct current power supply 6.

Triggering pulses for actuating the tunnel-diode 10 are applied across the blocking diode 12 between the terminals 14 and 5. Triggering pulses, alternating with the above, are also applied across the blocking diode 22, between the terminals 24 and 5, for actuating the tunnel-diode 20.

Figure 2:
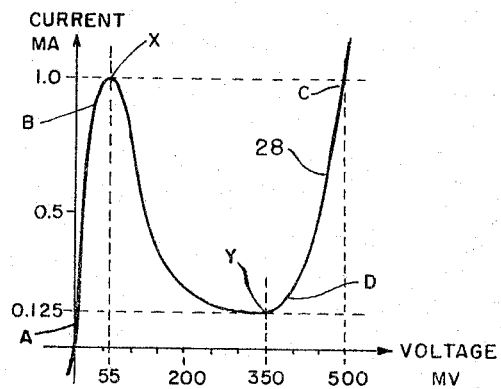
FIG. 2 shows the characteristic curve of a typical tunnel-diode.

The operation of this circuit will be better understood by referring to FIG. 2 of the drawings which shows the characteristic curve 28, of current with respect to voltage, of a typical tunnel-diode. This curve shows two stable portions of the curve A–B and C–D, and the unstable portion of the curve between X and Y. The operation of this circuit utilizes the fact that the tunnel-diode can function stably over two separate voltage ranges.

The voltage available at the power supply 6, its internal resistance, and the other parameters of the circuit are shown to provide current at the level of B to flow through the blocking diode, the tunnel-diode, and the appropriate half of the primary winding.

In operation, when a pulse 35A is applied across the blocking diode 12, its voltage is in series with that of the direct current power supply 6, and increases the voltage across—and the current through—the tunnel-diode 10. As soon as the voltage drop across the tunnel-diode and the current reach values corresponding to X, the voltage drop across the tunnel-diode must jump up to the value at C before the current can increase further to accommodate the energy of pulse 35A.

With the termination of the pulse 35A, the voltage and current supply reverts back to the original value which is insufficient to maintain the current as well as the voltage at such a high level, but must be sufficient to maintain at least the current corresponding to the voltage drop of the level D across the tunnel-diode. When the voltage across the tunnel-diode drops to the level of D the current through the corresponding half of the primary winding of the transformer drops from the level of C to the level of D.

This change in current in the one half 15 of the primary induces a voltage, in the other half 25 of the primary winding. This induced voltage is opposite in polarity to the voltage of the source 6 and, momentarily, reduces the voltage drop across the corresponding tunnel-diode 20 below the level of Y. However, since the range between X and Y is unstable, the voltage drop across the tunnel-diode must jump down to the level at X, whereat the current through the circuit seeks its new level B corresponding to the decreased voltage drop across the tunnel-diode.

When a pulse 35B is subsequently applied across the blocking diode 22, the foregoing chain of events occurs to the other half of the circuit; reducing the current in the half 25 of the transformer from the levels B and C to the level of D and increasing the current in the half 15 of the transformer from the levels D and A to the level of B to complete the cycle. Thus the drop in current in one half of the primary winding, causes the increase in current in the other half of the primary winding in the opposite direction, and the successive input pulses alternately reverse the direction of the change in current, which, of course, induces an alternating voltage in the secondary winding 7 of the transformer 4.

The alternating voltage in the secondary winding is applied across the terminals 8 and 9 to any appropriate load.

The voltage of the source 6 and the internal resistance of the source, together with the resistances of the series-connected circuit elements must be such that, when the voltage drop of the tunnel-diode is less than the voltage of X, the current in the circuit will be as high as possible without exceeding that of the level of X. Conversely, when the voltage drop of the tunnel-diode is greater than the voltage of Y, the current in the circuit should be as low as possible without exceeding that of the level of Y. This will provide the maximum current through the circuit, and change in current in the primary windings 15 and 25, during each half-cycle reversal of current, and will produce the maximum output in the secondary. However, it is essential that the voltage of the source 6 and the internal resistance of the source, together with the resistances of the series-connected circuit elements, be such that the current at the operating point B will be sufficiently below the level at X and the current at the operating point D will be sufficiently above the level at Y to avoid unstable operation.

Figure 3:
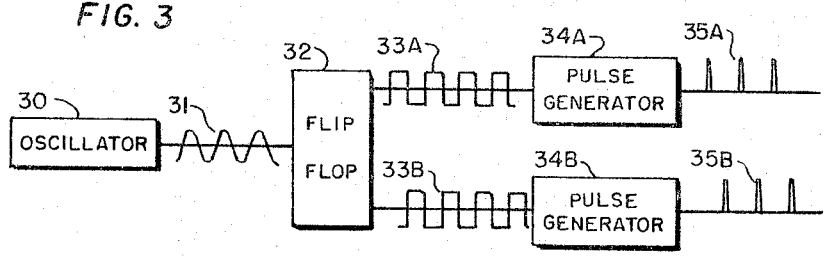
FIG. 3 shows the block diagram of a pulse forming circuit to provide the necessary switching pulses.

FIG. 3 shows a block diagram of one system for developing the switching pulses. This system uses an oscillator 30, which may also be a tunnel-diode device, which feeds into a flip-flop circuit 32 which provides two outputs that are connected to the pulse generators 34A and 34B.

The oscillator 30 produces a characteristic output waveform, such as that shown at 31 and the flip-flop circuit produces square wave outputs which are shown at 33A and 33B and are seen to be in phase opposition. The pulse generators 34A and 34B produce the trains of pulses 35A and 35B that are of equal amplitude, positive in polarity, and alternating in time sequence.

These trains of pulses are applied to the corresponding inputs 14–5 and 24–5 of the circuit of FIG. 1.

It will be obvious to anyone skilled in the art that these pulses can be produced in other ways and that almost any manner of producing these pulses would be applicable here. The voltage and the current available in the pulses must be enough to drive each tunnel-diode above its peak point X, but they should not be so great that the tunnel-diode might be damaged or that the transformer would have any significant, unnecessary, additional load.

The transformer 4 should have the correct turns ratio, and windings to produce the desired output and to make the most efficient use of the change of current available in the tunnel-diodes. The core of the transformer should be of the correct size and shape to handle the change in flux, necessary for operation of this circuit, without saturating.

Since both tunnel-diodes are operating off the same source of voltage, they should have closely similar characteristics. Other voltage and current characteristics can be accommodated by other types of tunnel-diodes, or by connecting other tunnel-diodes in series or parallel combinations with the tunnel-diodes shown in FIG. 1.

The blocking diodes 12 and 22 need only accommodate a relatively low voltage when they are blocking, but they must accommodate a relatively high current at a very low voltage drop when they are conducting. This would suggest the use of one of the back-diode, tunnel rectifiers of a current carrying capacity comparable to that of the tunnel-diodes used in this circuit.

In a typical circuit in accordance with this invention, the tunnel-diodes 10 and 20 are of the type 1N3850 made by RCA; the back-diode tunnel rectifiers 12 and 22 are of the type 1N3861 made by RCA; the voltage of the power supply 6 is between .2 and .3 volt; and the transformer has one turn in each half of the primary winding, 24 turns in the secondary winding, and a "supermolly" core of the type 5320 made by Magnetics Incorporated. This will produce an output of 6 volts at 500 cycles.

What is claimed is:

1. A tunnel-diode static inverter comprising
   a transformer having a center-tapped primary winding and a secondary winding;
   a first tunnel-diode having a terminal of one polarity connected to one end of said primary winding;
   a source of direct voltage;
   means for connecting said source of direct voltage between said center-tap of said primary winding and the terminal of the other polarity of said first tunnel-diode;
   a second tunnel-diode having the terminal of said one polarity connected to the other end of said primary winding;
   means for connecting said source of direct voltage between said center-tap of said primary winding and the terminal of said other polarity of said second tunnel-diode;
   means for applying pulses to said other terminal of said first tunnel-diode; and
   means for applying pulses, alternating in sequence with said above pulses, to said other terminal of said second tunnel-diode.

2. A tunnel-diode static inverter comprising
   a transformer having a center-tapped primary winding, and a secondary winding;
   a source of direct voltage;
   a first tunnel-diode;
   a first blocking diode connected in series with said first tunnel-diode, said source of voltage, and one half of said primary winding;
   a second tunnel-diode;
   a second blocking diode connected in series with said source of voltage, said second tunnel-diode, and the other half of said primary winding;
   means for applying a first source of pulses across said first blocking diode;
   means for applying a second source of pulses, alternating with the pulses of said first source, across said second blocking diode; and
   means for connecting an output load across said secondary winding.

3. A tunnel-diode static inverter comprising
   a transformer having a center-tapped primary winding and a secondary winding;
   a first tunnel-diode having its cathode connected to one end of said primary winding;
   a second tunnel-diode having its cathode connected to the other end of said primary winding;
   a source of voltage having its negative terminal connected to said center-tap of said primary winding;
   a first means for connecting the positive terminal of said source of voltage to the anode of said first tunnel-diode;
   a second means for connecting said positive terminal of said source of voltage to the anode of said second tunnel-diode;
   a first means for applying pulses to said anode of said first tunnel-diode; and
   a second means for applying pulses, alternating in sequence with the pulses of said first means, to said anode of said second tunnel-diode.

4. A tunnel-diode static inverter as in claim 3 wherein said first means for connecting the positive terminal of said source of voltage to the anode of said first tunnel-diode comprises a first blocking diode having its anode connected to said positive terminal of said source of voltage, and its cathode connected to said anode of said first tunnel-diode; and
said second means for connecting the positive terminal of said source of voltage to the anode of said second tunnel-diode comprises a second blocking diode having its anode connected to said positive terminal of said source of voltage, and its cathode connected to said anode of said second tunnel-diode.

5. A tunnel-diode static inverter as in claim 3 having means for connecting an output load to said secondary winding.

References Cited by the Examiner
UNITED STATES PATENTS

| | | |
|---|---|---|
| 2,809,303 | 10/1957 | Collins. |
| 3,167,723 | 1/1965 | Marzolf. |
| 3,192,465 | 6/1965 | Keller _____ 331—107 X |
| 3,217,268 | 11/1965 | Kuo Chen Hu _____ 331—107 |
| 3,231,831 | 1/1966 | Hines _____ 331—107 X |

JOHN F. COUCH, *Primary Examiner.*

W. M. SHOOP, *Assistant Examiner.*